United States Patent

Izumoto et al.

[11] Patent Number: 5,975,173
[45] Date of Patent: Nov. 2, 1999

[54] PNEUMATIC TIRE USING FIBER COMPOSITE MATERIAL

[75] Inventors: Ryuji Izumoto; Teruo Miura; Koshiro Monji; Shinichi Iwasaki; Kentaro Fujino; Masayuki Ohashi, all of Tokyo, Japan

[73] Assignee: Bridgestone Corporation, Tokyo, Japan

[21] Appl. No.: 08/740,952

[22] Filed: Nov. 5, 1996

[30]     Foreign Application Priority Data

Nov. 6, 1995 [JP] Japan ................................... 7-287163
Mar. 22, 1996 [JP] Japan ................................... 8-091808

[51] Int. Cl.$^6$ .............................. B60C 1/00; B60C 11/00; B60C 11/12
[52] U.S. Cl. .................................... 152/209.4; 152/209.7; 152/209.15; 152/209.18; 152/458; 152/DIG. 3
[58] Field of Search ........................... 152/209 R, 209 D, 152/458, 209.4, 209.7, 209.15, 209.18; 428/295.1

[56]              References Cited

U.S. PATENT DOCUMENTS

| | | | |
|---|---|---|---|
| 3,057,389 | 10/1962 | Dubetz et al. | 152/458 |
| 3,592,954 | 7/1971 | Widdowson | 152/458 |
| 5,173,136 | 12/1992 | Agarwal et al. | 152/209 R |
| 5,176,765 | 1/1993 | Yamaguchi et al. | 152/209 R |
| 5,240,772 | 8/1993 | Henning | 152/556 |
| 5,351,734 | 10/1994 | Mouri et al. . | |
| 5,624,515 | 4/1997 | Onoe et al. | 156/137 |

FOREIGN PATENT DOCUMENTS

| | | | |
|---|---|---|---|
| 2049784 | 3/1992 | Canada | 152/209 R |
| 350944 | 1/1990 | European Pat. Off. . | |
| 0481913 | 4/1992 | European Pat. Off. . | |
| 673792 | 9/1995 | European Pat. Off. | 152/209 R |
| 0686714 | 12/1995 | European Pat. Off. . | |
| 55-145007 | 11/1980 | Japan | 152/458 |
| 62-191204 | 8/1987 | Japan | 152/209 R |
| 63-34206 | 2/1988 | Japan | 152/209 R |
| 63-89547 | 4/1988 | Japan . | |
| 3-152140 | 6/1991 | Japan . | |
| 4-38206 | 2/1992 | Japan . | |
| 4-38207 | 2/1992 | Japan . | |
| 4-176707 | 6/1992 | Japan . | |
| 4-176708 | 6/1992 | Japan . | |

OTHER PUBLICATIONS

Abstracts for Japan 4–38207; Japan 63–89547; Japan 4–176708; Japan 4–176707; Japan 4–38206; Japan 3–152140.
Patent Abstracts of Japan—5059709 Mar. 9, 1993.
Patent Abstracts of Japan—6328905 Nov. 29, 1994.

*Primary Examiner*—Steven D. Maki
*Attorney, Agent, or Firm*—Sughrue, Mion, Zinn, Macpeak & Seas, PLLC

[57]              ABSTRACT

A fiber composite material in which short fibers, such as polyester short fibers, are added to a matrix, such as a cross-linked rubber matrix, is provided, wherein a heat shrinkage ratio of the short fibers is 8% or less at fiber composite material molding temperatures of 140 to 200° C. Also provided is a pneumatic tire in whose tire tread the fiber composite material is used. Such pneumatic tires include pneumatic tires provided with a foamed rubber layer in a tire tread. The foamed rubber layer has an average cell diameter of 10 to 120 $\mu$m and an expansion ratio of 3 to 50%. A solid phase rubber portion of the foamed rubber layer includes 5 to 55 parts by weight of carbon black, 55 to 5 parts by weight of silica, and 1 to 15 parts by weight of short fibers to 100 parts by weight of a diene-base rubber component including 70 to 20 parts by weight of natural rubber and 30 to 80 parts by weight of polybutadiene rubber. A surface of the tire tread has a hardness of 52 or less at 0° C. The short fibers have a length which is from 0.5 to 3 mm and which is shorter than a minimum gap between sipes of a tire surface, a diameter of 30 to 100 $\mu$m, an aspect ratio of 5 to 100, and a heat shrinkage ratio of 8% or less at 140 to 200° C. On-ice performance of the pneumatic tire of the present invention is excellent.

15 Claims, 2 Drawing Sheets

AFTER THE VEHICLE HAS TRAVELED

IN THE INITIAL STAGES OF TRAVELING OF THE VEHICLE

FIG. 3B

AFTER THE VEHICLE HAS TRAVELED

FIG. 3C

AFTER THE WEAR OF TIRE

PNEUMATIC TIRE USING FIBER COMPOSITE MATERIAL

BACKGROUND OF THE INVENTION

1. Field of the Invention

The present invention relates to a fiber composite material having improved orientation of fibers and excellent friction resistance with respect to ice, and to a pneumatic tire in whose tread portion the fiber composite material is used and which has markedly improved running performances, such as braking, traction and cornering, on icy roads. (Such performances will be referred to hereinafter as "on-ice performances".)

2. Description of the Related Art

Characteristics of a matrix material are often improved by using a material having elasticity, such as a rubber or an elastomer, as a matrix and compounding fillers, fibers or the like into the matrix. For example, Japanese Patent Application Laid-Open (JP-A) No. 4-38206 discloses a method of controlling the rigidity of a tire by adding short fibers to a matrix rubber. Japanese Patent Application Laid-Open (JP-A) No. 3-152140 discloses a method of improving the on-ice characteristics due to the dropping off of fibers which have been added into a matrix rubber of a tire. In this way, by compounding short fibers into the matrix such that the short fibers either adhere or do not adhere to the matrix, a material having various functions can be obtained.

The functions realized by the compounding of the short fibers are brought about by the orientation of the short fibers within the matrix.

Figure 1:
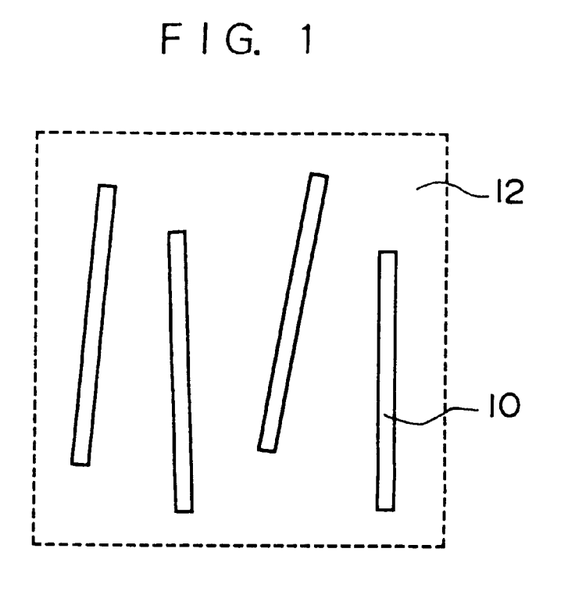
FIG. 1 is a schematic view illustrating a state of short fibers before the short fibers are compounded.
Figure 2:
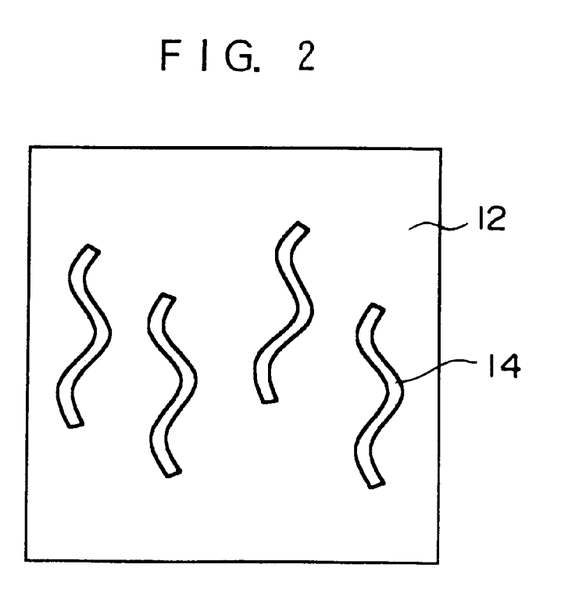
FIG. 2 is a schematic view illustrating a heat shrunken state of short fibers in the molding processing of a conventional composite material.

Generally, short fibers 10 illustrated in FIG. 1 are subjected to stress, heat and the like at the time of being compounded with a matrix 12 so as to become short fibers 14 (see FIG. 2) which have shrunk due to heat shrinkage. In this shrunken state illustrated in FIG. 2, the short fibers 14 are compounded with the matrix 12. Accordingly, because the composite material contains shrunken fibers, the functions which are obtained by the orientation of the fibers deteriorate.

Because the orientation of the short fibers in a conventional short fiber composite material deteriorates, it is difficult to control the physical properties resulting from the compounding of short fibers, anisotropy of the short fibers worsens, and functions such as the on-ice performance of a pneumatic tire in whose tread portion such a material is used deteriorate. This phenomenon is more marked in cases in which the short fibers have not undergone adhesion processing for adhering the short fibers to the matrix than in cases in which the short fibers have been subjected to such adhesion processing.

Japanese Patent Application Laid-Open (JP-A) Nos. 4-38206, 4-176707 and 4-176708 for example disclose, as a pneumatic tire provided with a foamed rubber layer (hereinafter "foamed tire"), a tire which is used as a studless tire and in which foamed rubber and short fibers are used in the tire tread. The technologies disclosed in these publications for improving on-ice performance orient the fibers in the tire circumferential direction and increase the rigidity in order to improve the edge effect. On the other hand, in these technologies, attempts are made to not raise the rigidity by disposing the fibers to run along the direction orthogonal to the tire circumferential direction, because lower rigidity is important for the adhesive friction effect (hereinafter, "adhesive effect") which occurs when the rubber contacts an icy road surface. In this way, both the edge effect and the adhesive effect can be established simultaneously.

However, in actuality, even if the fibers are oriented and compounded as described above, among fibers which have been subjected to adhesion processing to adhere to the rubber as well as fibers which have not been subjected to such processing, those fibers which are smaller than a certain size result in an increase in the rigidity of the tread rubber also in a direction orthogonal to the direction of orientation due to the filler effect. Further, when foaming is also carried out, the orientation of the fibers in the circumferential direction of the tire becomes disordered, and in an actual studless tire in which grooves known as sipes are formed in a dense concentration in the tread portion, when the tire is vulcanized, the orientation of the compounded fibers becomes even more disordered due to blades which are used for forming the sipes. As a result, the tire radial direction rigidity, which is important to the adhesive effect, increases, and hardly any improvement in the on-ice performance can be observed.

Japanese Patent Application Laid-Open (JP-A) No. 63-89547 discloses a foamed rubber composition in which a fibrous material is randomly compounded. In this case, although orientation of the fibers is not carried out, the modulus of elasticity increases in all directions so that there is little improvement in the on-ice performance.

Japanese Patent Application Laid-Open (JP-A) No. 4-38207 discloses improving the water-removing effect and the on-ice performance by mixing short fibers having poor adhesion with foamed rubber so that the foam gas gathers around the short fibers and forms continuous cells. However, in actuality, the foaming reaction is not concentrated around the short fibers. However, because short fibers having poor adhesion to rubber are compounded, it is easy for the fibers to drop off due to actual use of the tire on a traveling vehicle. Such dropping off leaves concave portions in the tire, which result in a water-removing effect. However, when rigid fibers such as aramide fibers or carbon fibers are used, the hardness of the entire rubber increases, which adversely affects the adhesive effect. On the other hand, as described above, when general organic fibers such as nylon fibers or polyester fibers are used, the fibers heat-shrink during the molding process, and the configuration of the fibers changes from the configuration illustrated in FIG. 1 to that of FIG. 2. Therefore, the flow of water to be removed from the ground-contact surface of the tire is not smooth, and it is difficult for water to be effectively removed from the ground-contact surface, so that a sufficient improvement in the on-ice performance cannot be obtained. Further, when such organic fibers are used, in this case as well, the drawback arises in that if the fibers are smaller than a given size, a filler effect occurs and the hardness of the rubber increases.

As has been described above, conventional combinations of foamed rubber and short fibers have resulted in drawbacks such as an increase in the hardness of the rubber. Although the running performances on dry roads and wet roads may improve, the improvement in on-ice performance, which is a fundamental object of studless tires, has been insufficient.

SUMMARY OF THE INVENTION

An object of the present invention is to provide a fiber composite material which has improved orientation of fibers and excellent friction characteristics with respect to ice.

Another object of the present invention is to provide a pneumatic tire in whose tread portion the aforementioned fiber composite material is used and which has improved on-ice friction.

Yet another object of the present invention is to provide a pneumatic tire which utilizes a combination of short fibers and foamed rubber in the tread rubber thereof, and which simultaneously exhibits an excellent water-removing effect and a sufficient adhesive effect and which has outstanding running performance on various icy road surfaces from extremely low temperatures to around 0° C., as compared with the conventional art and without a deterioration in any of the performances of the tire.

In order to overcome the above-described drawbacks of the prior art, the present inventors studied the mechanical characteristics of fibers such as strength and elongation, the thermal characteristics of fibers such as the heat shrinkage ratio, and the like, and focused their efforts on ameliorating the shrinkage of fibers when stress and heat are applied at the time of molding.

The present inventors also studied the characteristics of the short fibers compounded in the tread rubber such as the configuration of the fibers, the compounding materials in the solid rubber (the rubber matrix), the physical properties of the rubber, the expansion ratio, the cell diameter, and the relation between the cell diameter and the short fiber diameter. The present inventors thereby found that the above-described objects could be achieved by the means described hereinafter, and thus arrived at the present invention.

One aspect of the present invention is a fiber composite material in which short fibers are added to a matrix, wherein a heat shrinkage ratio of the short fibers is less than or equal to 8% at molding temperatures of the composite material of 140 to 200° C.

Another aspect of the present invention is a pneumatic tire in whose tire tread portion the above-described fiber composite material is used.

Yet another aspect of the present invention is a pneumatic tire in which a foamed rubber layer having closed cells is provided at least at a surface of a tire tread which surface substantially contacts a road surface, wherein the foamed rubber layer has an average cell diameter of 10 to 120 μm and an expansion ratio of 3 to 50%, and a solid phase rubber portion of the foamed rubber layer comprises 5 to 55 parts by weight of carbon black, 55 to 5 parts by weight of silica, and 1 to 15 parts by weight of short fibers with respect to 100 parts by weight of a diene-base rubber component which includes 70 to 20 parts by weight of natural rubber and 30 to 80 parts by weight of polybutadiene rubber, a hardness of the surface of the tire tread being 52 or less at 0° C., and the short fibers have a length which is from 0.5 to 3 mm and which is shorter than a minimum gap between sipes of a tire surface, a diameter of 30 to 100 μm, an aspect ratio of 5 to 100, and a heat shrinkage ratio of 8% or less at tire molding temperatures of 140 to 200° C.

DETAILED DESCRIPTION OF THE INVENTION

At temperatures of 140 to 200° C., which are the molding temperatures of the composite material of the present invention, the heat shrinkage ratio of the short fibers used in the fiber composite material of the present invention must be less than or equal to 8%, and from the standpoint of obtaining advantageous effects, preferably less than or equal to 4%, and more preferably less than or equal to 2%. If the heat shrinkage ratio exceeds 8%, during compounding, the short fibers shrink and the desired orientation of the short fibers in the matrix cannot be achieved. A pneumatic tire using such a short fiber composite material in the tread portion thereof exhibits a marked deterioration in on-ice performance.

Methods for controlling the heat shrinkage ratio of the short fibers to less than or equal to 8% include the following: (1) carrying out the drawing process, which is effected during the spinning of the fibers, at a temperature higher than the molding temperature of the composite material of the matrix and the short fibers (with this method, better effects are exhibited if short fibers having a low drawing tension and a low drawing magnification are used); and (2) before molding, subjecting the short fibers to heat processing at a temperature which is greater than or equal to the molding temperature of the composite material of the matrix and the short fibers.

The short fibers used in the fiber composite material of the present invention are not particularly limited provided that the heat shrinkage ratio thereof at molding temperatures of the composite material is less than or equal to 8%. However, from the standpoint of obtaining advantageous effects, one or more types of fibers selected from organic synthetic fibers, regenerated fibers and natural fibers are preferably used. Examples of organic synthetic fibers include nylon, polyester, and Kevlar. An example of regenerated fibers is rayon, and examples of natural fibers include cotton and wool. Among these fibers, nylon fibers and polyester fibers, whose heat shrinkage can easily be controlled, are preferable from the standpoint of obtaining advantageous effects.

Short fibers having the following dimensions are preferably used in the fiber composite material of the present invention: the average length is 0.1 to 100 mm, and from the standpoint of obtaining advantageous effects, preferably 0.5 to 50 mm, and more preferably 1 to 20 mm; the average diameter is 1 to 150 μm, and from the standpoint of obtaining good effects, preferably 5 to 100 μm, and more preferably 10 to 60 μm; and the aspect ratio is 5 to 1000, preferably 7 to 800, and more preferably 10 to 500. If the average length is less than 0.1 mm or greater than 100 mm, if the average diameter is less than 1 μm or exceeds 150 μm, or if the aspect ratio is less than 5 or greater than 1000, it is difficult for there to be any improvement in the functions of the composite material which are caused by the orientation of the short fibers.

The added amount of the short fibers is 0.1 to 80 volume percent of the volume of the matrix, and from the standpoint of achieving advantageous effects, preferably 0.5 to 30 volume percent, and more preferably 1 to 10 volume percent. If the added amount is less than 0.1 volume percent, it becomes difficult for the difference in the physical properties due to the addition of short fibers to be manifested. If the added amount of the short fibers is greater than 80 volume percent, the added amount is too large, and it becomes difficult to control the orientation.

The effects of the present invention are exhibited regardless of whether the short fibers used in the fiber composite material of the present invention are subjected to processing which is effective for adhering the short fibers to the matrix. However, the effects are more marked in cases in which such adhering processing is not carried out.

The matrix used in the fiber composite material of the present invention is one or more types selected from the group consisting of cross-linked rubbers, thermoplastic elastomers, and foamed materials thereof.

Examples of the cross-linked rubber include natural rubber (NR), butadiene rubber (BR), isoprene rubber (IR), styrene-butadiene rubber (SBR), halogenated butyl rubber, and mixtures thereof. Among these, a cross-linked rubber having a JIS A hardness of preferably 20 to 95° and more preferably 30 to 80° is preferably used from the standpoint of effects.

Examples of the thermoplastic elastomer include nylons (which are used in many casters and the like), urethanes, polyesters, and mixtures thereof.

Compounding agents commonly used in the rubber industry, e.g., fillers such as carbon black, vulcanizing agents such as sulfur, stearic acid, zinc oxide, vulcanization accelerators, antioxidants, softeners, and the like, can be appropriately compounded into the rubber. Ordinarily used third components such as lubricants, antioxidizing agents, pigments, softeners or the like can be appropriately compounded into the elastomer.

The aforementioned foamed materials are obtained by foaming the above-mentioned rubbers or elastomers.

The foaming agent used in the preparation of the foamed material used in the fiber composite material of the present invention may be, for example, ammonium bicarbonate or sodium bicarbonate which generate carbon dioxide, or a nitrososulfonylazo compound which generates nitrogen. Examples of the nitrososulfonylazo compound include dinitrosopentamethylenetetramine, N,N'-dimethyl-N,N'-dinitrosophthalamide, azodicarbonamide, N,N'-dinitrosopentamethylenetetramine, benzenesulfonylhydrazide, toluenesulfonylhydrazide, p,p'-oxy-bis(benzenesulfonylhydrazide), p-toluenesulfonylsemicarbazide, and p,p'-oxy-bis(benzenesulfonylsemicarbazide). The foaming agent can be selected appropriately in accordance with the vulcanization temperature. Further, examples of the foaming assisting agent include ureas.

The following compounding agents may be added appropriately as per common practice: softeners, vulcanizing agents, vulcanization accelerators, vulcanization assistants, antioxidants, and depending on the case, colorants, or charge preventing agents.

In cases in which the short fibers are to be compounded with a foamed rubber, the average cell diameter of the cells of the foamed rubber is preferably 10 to 300 $\mu$m, and more preferably 30 to 100 $\mu$m. When the average cell diameter is less than 10 $\mu$m, the effect of foaming the matrix is not obtained, whereas when the average cell diameter exceeds 300 $\mu$m, the orientation of the short fibers becomes greatly disordered due to the foaming, and the effects of the present invention cannot be obtained.

The expansion ratio Vs is represented by following equation (1):

$$Vs = \{(\rho_0-\rho_g)/(\rho_1-\rho_g)-1\} \times 100(\%) \qquad (1)$$

wherein $\rho_1$ is the density (g/cm$^3$) of a foamed rubber layer, $\rho_0$ is the density (g/cm$^3$) of a solid phase portion of the foamed rubber layer, and $\rho_g$ is the density (g/cm$^3$) of the gas contained in the cells of the foamed rubber layer. The foamed rubber layer is formed by a rubber solid phase portion and by the cells formed by the rubber solid phase portion, i.e., the gas portion within the cells.

Because the density $\rho_g$ of the gas portion is almost zero and is extremely small as compared with the density $\rho_g$ of the rubber solid phase portion, above equation (1) is substantially equivalent to following equation (2):

$$Vs = (\rho_0/\rho_1-1) \times 100(\%) \qquad (2)$$

The expansion ratio is preferably 3 to 50%, and more preferably 5 to 30%. If the expansion ratio is less than 3%, the effects of the foaming are not obtained. If the expansion ratio exceeds 50%, the orientation of the short fibers becomes greatly disordered due to the foaming, and the effects of the present invention are not achieved.

The fiber composite material of the present invention is a fiber reinforced composite material in which the short fibers compounded with the matrix rubber are oriented to a high degree within the matrix, and which has excellent anisotropy of physical properties. Therefore, the fiber composite material of the present invention can be used for a wide range of rubber goods or for members thereof. For example, the fiber composite material is extremely effective as a material for members of a tire, and for the tread portion in particular. Marked effects are exhibited in the on-ice friction performance and the like of a tire in which the fiber composite material of the present invention is used. Further, the material of the present invention can also be used as a fiber composite material for various types of industrial goods requiring fiber reinforcement of the matrix rubber, e.g., belts and casters, and belts in particular.

A foamed rubber tire in whose tread portion the above-described fiber composite material is used will be described in detail hereinafter as an embodiment of the present invention. The short fibers compounded in the foamed rubber layer of the foamed tire of the present invention drop off during traveling of a vehicle on which the tire is used so as to form flow paths for water, and the effect of removing water from the ground-contacting surface of the tire improves. Further, the concave portions of the traces formed by the dropping off of the short fibers connect with the concave portions of the foam as the tire is subjected to wear during traveling of the vehicle, so that a more effective water removing state is created at the tread surface. Further, the rubber matrix is not excessively hardened due to the filler effect.

Figure 3A:
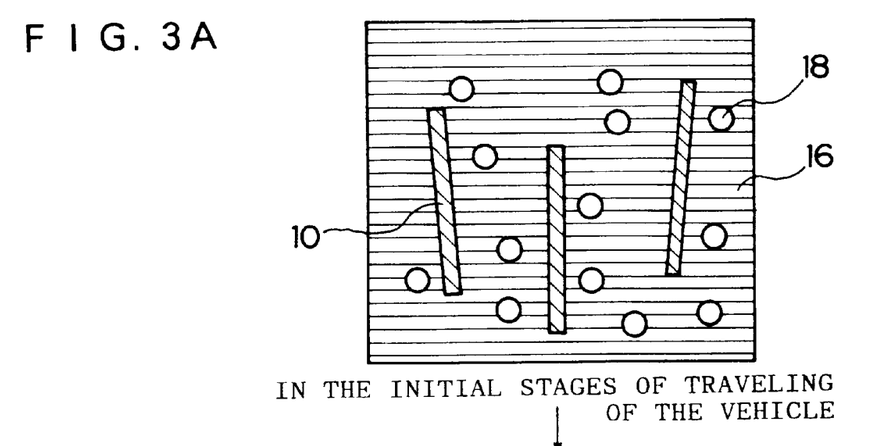
FIGS. 3A, 3B and 3C are explanatory views illustrating the creation, by short fibers, of a water removing state at a tread surface.
Figure 3B:
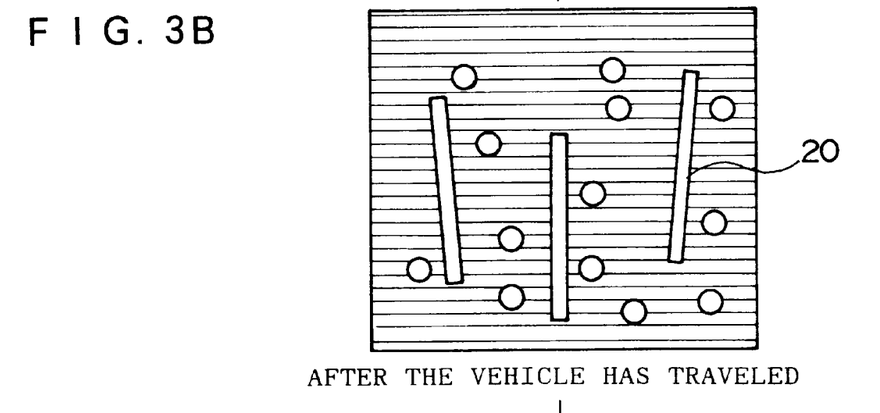
Figure 3C:
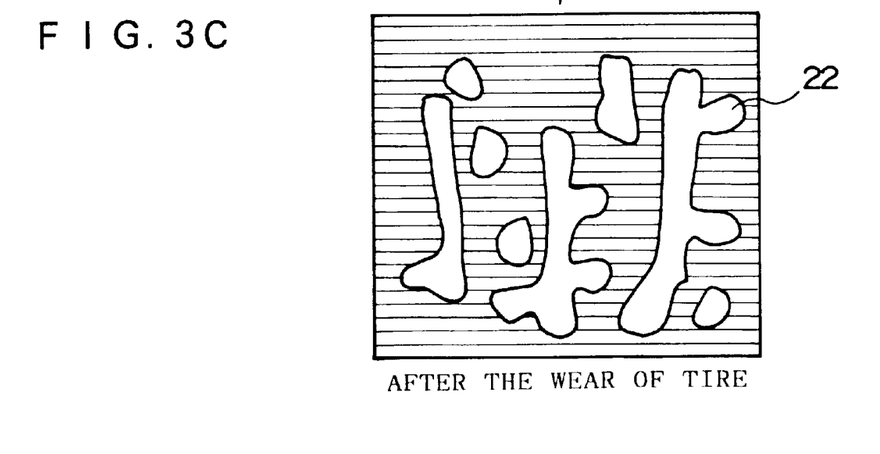

FIGS. 3A through 3C illustrate the creation, by the short fibers, of a water removing state at the tread surface. First, in the initial stages of traveling of the vehicle, as illustrated in FIG. 3A, cells 18 and short fibers 10 exist in a tread surface 16 which substantially contacts a road surface. Next, after the vehicle has traveled, as illustrated in FIG. 3B, concave portions 20 are formed in the traces formed by the dropping off of the short fibers 10, and these concave portions 20 form flow paths. Thereafter, as the wear proceeds, as illustrated in FIG. 3C, networks 22 of flow paths for removing water are formed starting with the concave portions of the cells 18 and the concave portions 20 which are the traces formed by the dropping off of the short fibers. In this way, the water removing effect is improved even more.

The length of the short fibers used in the foamed tire of the present invention is 0.5 to 3 mm, and preferably 1.5 to 2.5 mm. When the length is less than 0.5 mm, formation of the flow paths for removing water is insufficient. When the length is greater than 3 mm, the rubber matrix becomes overly hard, and workability deteriorates. Further, the length of the short fibers must be smaller than the smallest gap between sipes of the tire surface. If the fiber length is greater than the smallest gap between sipes, workability markedly deteriorates.

The diameter of the short fibers is 30 to 100 μm, and preferably 40 to 80 μm. If the diameter is less than 30 μm, the rubber matrix becomes markedly hard. If the diameter is greater than 100 μm, the number of short fibers per unit area decreases, and the formation of flow paths for removing water is insufficient.

The aspect ratio (length/diameter) of the short fibers is 5 to 100, and preferably 15 to 75. If the aspect ratio is less than 5, formation of flow paths is insufficient. An aspect ratio of greater than 100 leads to a deterioration in workability and to the rubber matrix becoming overly hard.

The heat shrinkage ratio at tire molding temperatures of 140 to 200° C. and preferably 170° C. is less than or equal to 8% and preferably 1 to 4%. If the heat shrinkage ratio is greater than 8%, curling of the material will become more pronounced by the heat shrinkage in each of the processes of kneading, extruding and vulcanization to which the material is subjected, and the formation of flow paths for water removal will be insufficient. In order for the rubber matrix not to become too hard, a heat shrinkage ratio of 1% or more is preferable. From the standpoint of manufacturing, in the kneading process, the short fibers should be introduced at the time of second stage kneading in order to not subject the material to repeated heatings. If the short fibers are introduced at the time of first stage kneading, it is preferable that the short fibers are introduced in a state in which the Mooney viscosity of the rubber compound is low after the rubber compound has been mixed in several processes.

The compounded amount of the short fibers is, per 100 parts by weight of the diene-base rubber component, 1 to 15 parts by weight, and preferably 3 to 10 parts by weight. If the compounded amount is less than 1 part by weight, formation of the flow paths is insufficient. If the compounded amount exceeds 15 parts by weight, the wear resistance deteriorates markedly, and the rubber matrix becomes overly hard.

The materials used for the short fibers used in the foamed tire of the present invention are the same as those used in the above-described fiber composite material.

The average cell diameter of the foamed rubber layer of the tread in the foamed tire of the present invention is 10 to 120 μm, and preferably 20 to 100 μm. If the average cell diameter is less than 10 μm, the flexibility of the rubber at low temperatures will deteriorate and the water removing effect is insufficient. If the average cell diameter exceeds 120 μm, the wear resistance deteriorates, and the strain restoring force and the permanent set resistance in load of the foamed rubber deteriorate. Further, the expansion ratio is 3 to 50% and preferably 15 to 40%. If the expansion ratio is less than 3%, no improvement in the on-ice performance can be observed. If the expansion ratio is greater than or equal to 50%, the wear resistance as well as the control stability on dry and wet road surfaces markedly deteriorate.

In the manufacturing of the foamed rubber layer used in the foamed tire of the present invention, the foaming agents and foaming assisting agents are the same as those used in the foamed materials of the above-described fiber composite material.

The solid phase rubber portion (matrix rubber) of the foamed rubber layer is formed from a diene-base rubber component including 70 to 20 parts by weight of natural rubber (NR) and 30 to 80 parts by weight of polybutadiene rubber (BR), and preferably 50 to 30 parts by weight of NR and 50 to 70 parts by weight of BR. If the amount of NR exceeds 70 parts by weight in 100 parts by weight of the diene-base rubber, the flexibility at low temperatures deteriorates. If the amount of NR is less than 20 parts by weight in 100 parts by weight of the diene-base rubber, the destruction characteristics deteriorate and much breaking of the blocks and the sipes occur. Moreover, if the amount of BR is less than 30 parts by weight in 100 parts by weight of the diene-base rubber, the flexibility at low temperatures deteriorates. If the amount of BR is greater than 80 parts by weight in 100 parts by weight of the diene-base rubber, the destruction characteristics deteriorate, and the control stability on wet roads (hereinafter, "wet performance") markedly deteriorates.

In the foamed tire of the present invention, per 100 parts by weight of the diene-base rubber, carbon black is compounded in an amount of 5 to 55 parts by weight and preferably 10 to 50 parts by weight, and silica is compounded in an amount of 5 to 55 parts by weight and preferably 30 to 50 parts by weight. If carbon black is used in an amount less than 5 parts by weight, the wear resistance and wet performance are insufficient, and with an amount of more than 55 parts by weight of carbon black, flexibility at low temperatures deteriorates. Similarly, when less than 5 parts by weight of silica is used, the wear resistance and wet performance are insufficient, whereas when more than 55 parts by weight of silica is used, flexibility at low temperatures deteriorates.

It is preferable to increase the added amount of the silica as the ratio of BR contained in 100 parts by weight of the diene-base rubber increases. For example, if the ratio of BR is 50%, it is preferable that at least 30 parts by weight of silica is used.

It is preferable that the nitrogen absorption specific surface area ($N_2SA$) of the carbon black and the silica used in the foamed tire of the present invention are 120 to 170 m$^2$/g and 180 to 250 m$^2$/g, respectively. If the nitrogen absorption specific surface areas are less than the above ranges, sufficient wear resistance cannot be guaranteed, whereas if the nitrogen absorption specific surface areas are too large, flexibility at low temperatures and workability deteriorate. Here, nitrogen absorption specific surface area ($N_2SA$) is a value calculated in accordance with ASTM D4820-93.

The hardness at 0° C. of the tread rubber of the foamed tire of the present invention is less than or equal to 52, and is preferably 40 to 49. If the hardness at 0° C. is greater than 52, the adhesive effect is insufficient and the on-ice performance at low temperatures deteriorates in particular. On the other hand, when the hardness at 0° C. is less than 40, control stability on dry roads and wet roads greatly deteriorates.

It is preferable that the relation between the average cell diameter and the diameter of the short fibers in the tire tread of the foamed tire of the present invention satisfies the following equation:

$$-30 \leq \text{average cell diameter} - \text{short fiber diameter} \leq 40 \ (\mu m)$$

It is more preferable that this relation satisfies the following equation:

$$0 \leq \text{average cell diameter} - \text{short fiber diameter} \leq 30 \ (\mu m)$$

These relational equations are important from the standpoint of controlling the wear configuration so as to form flow paths which are more beneficial for removing water, by traveling on the tire after short fibers have dropped off. If the difference between the average cell diameter and the diameter of the short fibers is greater than the upper limit value or less than the lower limit value of the above equation, in either case, the formation of the flow paths is insufficient, and there is little improvement in the on-ice performance.

In addition to the above-mentioned compounding components, the following may be compounded appropriately into the foamed rubber layer of the foamed tire of the present invention: antioxidants, waxes, vulcanization accelerators, vulcanizing agents, silane coupling agents, dispersants, stearic acid, zinc oxide, softeners (e.g., aromatic oils, naphthenic oils, paraffinic oils), ester base plasticizers, liquid polymers (e.g., liquid polyisoprene rubber, liquid polybutadiene rubber), and the like. Further, fillers such as $CaCO_3$, $MgCO_3$, $Al(OH)_3$, clay and the like may be added as needed.

The foamed tire of the present invention may be formed as a so-called cap-base structure in which the foamed rubber layer is the outer side (upper layer) of the tread portion and another rubber layer is at the inner side of the tread portion. In this case, it is preferable that the inner side of the tread portion is not foamed, and that the hardness thereof is 55 to 70 and is greater than the hardness of the outer side of the tread portion.

EXAMPLES

Hereinafter, the present invention will be described more concretely by the following examples. However, it is to be understood that the present invention is not limited to the following examples.

Preparation of Fibers

Fibers used in the Examples and the Comparative Examples and having different heat shrinkage ratios were prepared by varying the drawing process carried out after spinning. The fibers were not subjected to adhesion processing.

Measurements were carried out as follows.

(1) Configuration of the Fibers

The fibers were photographed by a 20 to 400 magnification light microscope. The lengths and diameters of over 100 fibers were measured, and average values were calculated. The configuration of the fibers is expressed by these average values.

(2) Heat Shrinkage Ratio of Fibers

The heat shrinkage ratio at 170° C. was measured in accordance with the dry heat shrinkage ratio method A (filament shrinkage ratio) stipulated in JIS L1073.

(3) Average Cell Diameter and Expansion Ratio Vs

A block-shaped sample was cut from a tread rubber (foamed material) of a test tire. A photograph of the cross-section of the sample was taken by a 100 to 400 magnification light microscope. The cell diameters of 20 or more closed cells were measured. The average value of these diameters was calculated and used as the average cell diameter.

The density $\rho_1$ (g/cm$^3$) of the above-described block-shape sample was measured, the density $\rho_0$ (g/cm$^3$) of a tread portion of an unfoamed rubber (solid phase rubber) was measured, and Vs was calculated by using above equation (2).

(4) $E'(\|)/E'(\perp)$

The storage elastic modulus E' of the dynamic viscoelasticity was measured, and the ratio of the dynamic viscoelasticity in the orientation direction ($\|$) and the dynamic viscoelasticity in the direction ($\perp$) orthogonal to the orientation direction was used as the physical property expressing the degree of orientation. When the fibers are compounded randomly, $E'(\|)/E'(\perp)=1$. When this ratio exceeds 1, the greater the ratio becomes, the higher the orientation is.

A spectrometer manufactured by Toyo Seiki was used to measure the dynamic viscoelasticity under the following measurement conditions: temperature=room temperature, frequency=50 Hz, initial load=150 g, and amplitude=1%. A sample having a width of 6 mm, a diameter of 2 mm, and a length of 20 mm between the chucks holding the sample was measured.

(5) JIS Hardness

The hardness of the tire tread surface at 0° C. was measured in accordance with JIS K6301.

(6) On-Ice Performance

The index of the on-ice performance expresses the on-ice braking performance. A 185/70R13 size tire was used. In Examples 1 through 8 and Comparative Examples 1 through 4, four test tires were placed on a 1500 cc passenger vehicle, and the braking distance on ice at a speed of 20 km/hr at an outside temperature of 0 to –3° C. was measured. In Examples 9 through 16 and Comparative Examples 5 through 11, four test tires were placed on a 1600 cc passenger vehicle, and the braking distance on ice at a speed of 20 km/hr at outside temperatures of –1° C. and –8° C. was measured.

The on-ice performance was calculated in accordance with following equation (3).

$$\text{on-ice performance} = \frac{\text{braking distance of control tire}}{\text{braking distance of tire using fibers}} \times 100 \quad (3)$$

In Examples 1 through 4 and Comparative Examples 1 and 2, to illustrate the effects of unfoamed matrices, the performance of an unfoamed control tire (Comparative Example 1) using a tread material in which polyester fibers (diameter: 32 $\mu$m; length: 2 mm; added amount: 5 volume percent; heat shrinkage ratio: 13.7%) were compounded was expressed as an index of 100.

In Examples 5 through 8 and Comparative Examples 3 and 4, to illustrate the effects of foamed matrices, the performance of a foamed control tire (Comparative Example 3) using a tread material in which polyester fibers (diameter: 32 $\mu$m; length: 2 mm; added amount: 5 volume percent; heat shrinkage ratio: 13.7%) were compounded was expressed as an index of 100.

To illustrate the performance of foamed tires in Examples 9 through 16 and Comparative Examples 5 through 11, the performance of a control tire (Example 9) was expressed as an index of 100. The minimum length between sipes in the test tire was 3 mm. The short fibers used in Examples 9 through 16 and Comparative Examples 7 through 11 were polyester fiber monofilaments.

Example 1

Polyester short fibers having a diameter of 32 $\mu$m, a length of 2 mm and a heat shrinkage ratio of 7.2% were added to a rubber component in an amount of 5 volume percent of the rubber component. The compounding agents of Table 1 were added in the amounts thereof listed in Table 1, and the compound was kneaded for 5 minutes at 150° C. by using a Labo-Plasto Mill (manufactured by Toyo Seiki). Thereafter, the compound was sheeted by rolls for 1 minute at 60° C., and was then vulcanized for 20 minutes at 160° C. The ratio E'(orientation direction)/E'(perpendicular direction) of the vulcanizate was measured, and the results are listed in Table 3. A pneumatic tire in whose tread portion this compound was used was manufactured, and the on-ice friction performance of the tire was measured. These results are also listed in Table 3.

Examples 2 and 3

Examples 2 and 3 were carried out in the same manner as Example 1, except that, in Example 2, the polyester short fibers had a heat shrinkage ratio of 3.7%, and in Example 3, the polyester short fibers had a heat shrinkage ratio of 1.4%.

Vulcanizates were prepared, tires were manufactured, and the ratio E'(orientation direction)/E'(perpendicular direction) and the on-ice performance were measured for each of Examples 2 and 3. The results are listed in Table 3.

Comparative Example 1

Comparative Example 1 was carried out in the same manner as Example 1, except that, in Comparative Example 1, the heat shrinkage ratio of the polyester short fibers was 13.7%. A vulcanizate was prepared, tires were manufactured, and the ratio E'(orientation direction)/E' (perpendicular direction) and the on-ice performance were measured. The results are listed in Table 3.

Example 4

Nylon short fibers having a diameter of 35 μm, a length of 2 mm and a heat shrinkage ratio of 5.4% were added to a rubber component in an amount of 5 volume percent of the rubber component. In the same way as Example 1, a vulcanizate was prepared, tires were manufactured, and the ratio E'(orientation direction)/E'(perpendicular direction) and the on-ice performance were measured. The results are listed in Table 3.

Comparative Example 2

Comparative Example 2 was carried out in the same manner as Example 4, except that, in Comparative Example 2, the heat shrinkage ratio of the nylon short fibers was 16.2%. A vulcanizate was prepared, tires were manufactured, and the ratio E'(orientation direction)/E' (perpendicular direction) and the on-ice performance were measured. The results are listed in Table 3.

Example 5

Polyester short fibers having a diameter of 32 μm, a length of 2 mm and a heat shrinkage ratio of 7.2% were added to a rubber component in an amount of 5 volume percent of the rubber component. The compounding agents of Table 2, except for the foaming agent and urea, were added in the amounts thereof listed in Table 2, and the compound was kneaded for 5 minutes at 150° C. by using a Labo-Plasto Mill (manufactured by Toyo Seiki). Thereafter, the foaming agent and urea were added in the compounding amounts listed in Table 2, and the compound was further kneaded for 1 minute at 80° C. by using the Labo-Plasto Mill. This compound was sheeted by rolls for 1 minute at 60° C., and was then vulcanized for 20 minutes at 160° C. The ratio E'(orientation direction)/E'(perpendicular direction) of the vulcanizate was measured, and the results are listed in Table 4. A pneumatic tire in whose tread portion this compound was used was manufactured, and the on-ice friction performance of the tire was measured. The results are listed in Table 4.

Examples 6 and 7

Examples 6 and 7 were carried out in the same manner as Example 5, except that, in Example 6, the polyester short fibers had a heat shrinkage ratio of 3.7%, and in Example 7, the polyester short fibers had a heat shrinkage ratio of 1.4%. Vulcanizates were prepared, tires were manufactured, and the ratio E'(orientation direction)/E'(perpendicular direction) and the on-ice performance were measured for each of Examples 6 and 7. The results are listed in Table 4.

Comparative Example 3

Comparative Example 3 was carried out in the same manner as Example 5, except that, in Comparative Example 3, the heat shrinkage ratio of the polyester short fibers was 13.7%. A vulcanizate was prepared, tires were manufactured, and the ratio E'(orientation direction)/E' (perpendicular direction) and the on-ice performance were measured. The results are listed in Table 4.

Example 8

Nylon short fibers having a diameter of 35 μm, a length of 2 mm and a heat shrinkage ratio of 5.4% were added to a rubber component in an amount of 5 volume percent of the rubber component. In the same way as Example 5, a vulcanizate was prepared, tires were manufactured, and the ratio E' (orientation direction)/E'(perpendicular direction) and the on-ice performance were measured. The results are listed in Table 4.

Comparative Example 4

Comparative Example 4 was carried out in the same manner as Example 8, except that, in Comparative Example 4, the heat shrinkage ratio of the nylon short fibers was 16.2%. A vulcanizate was prepared, tires were manufactured, and the ratio E'(orientation direction)/E' (perpendicular direction) and the on-ice performance were measured. The results are listed in Table 4.

TABLE 1

Unfoamed Rubber Compounding Agents

Rubber components

| | |
|---|---|
| Natural rubber | 70 parts by weight |
| Butadiene rubber | 30 parts by weight |
| Short fibers | 5 parts by weight |
| Carbon black | 55 parts by weight |
| Stearic acid | 1 part by weight |
| Zinc oxide | 3 parts by weight |
| Antioxidant | 1.5 parts by weight |
| Vulcanization accelerator | 1.5 parts by weight |
| Vulcanization accelerator | 1.5 parts by weight |
| Sulfur | 1.5 parts by weight |

TABLE 2

Foamed Rubber Compounding Agents

Rubber components

| | |
|---|---|
| Natural rubber | 100 parts by weight |
| Short fibers | 5 parts by weight |
| Carbon black | 55 parts by weight |
| Stearic acid | 1 part by weight |
| Zinc oxide | 3 parts by weight |
| Antioxidant | 1.5 parts by weight |
| Vulcanization accelerator | 1.5 parts by weight |
| Vulcanization accelerator | 1.5 parts by weight |
| Dinitrosopentamethylenetetramine (foaming agent) | 2.5 parts by weight |
| Urea | 2.5 parts by weight |
| Sulfur | 1.5 parts by weight |

TABLE 3

Unfoamed Matrix

| | Comparative Example | Examples | | | Comparative Example | Example |
|---|---|---|---|---|---|---|
| | 1 | 1 | 2 | 3 | 2 | 4 |
| Fibers | | | | | | |
| Type | polyester | polyester | polyester | polyester | nylon | nylon |
| Shape | | | | | | |
| Diameter (μm) | 32 | 32 | 32 | 32 | 35 | 35 |

TABLE 3-continued

Unfoamed Matrix

|  | Comparative Example | Examples | | | Comparative Example | Example |
|---|---|---|---|---|---|---|
|  | 1 | 1 | 2 | 3 | 2 | 4 |
| Length (mm) | 2 | 2 | 2 | 2 | 2 | 2 |
| Added Amount (vol %) | 5 | 5 | 5 | 5 | 5 | 5 |
| Heat Shrinkage Ratio (%) | 13.7 | 7.2 | 3.7 | 1.4 | 16.2 | 5.4 |
| E'(∥)/E'(⊥)* | 1.27 | 1.58 | 1.69 | 1.82 | 1.23 | 1.57 |
| On-ice performance of tire (index) | 100 (control) | 138 | 157 | 171 | 99 | 146 |

*E'(∥): storage elastic modulus in orientation direction
E'(⊥): storage elastic modulus in direction orthogonal to orientation

TABLE 4

|  | Comparative Example | Examples | | | Comparative Example | Example |
|---|---|---|---|---|---|---|
|  | 3 | 5 | 6 | 7 | 4 | 8 |
| Fibers |  |  |  |  |  |  |
| Type | polyester | polyester | polyester | polyester | nylon | nylon |
| Shape |  |  |  |  |  |  |
| Diameter (μm) | 32 | 32 | 32 | 32 | 35 | 35 |
| Length (mm) | 2 | 2 | 2 | 2 | 2 | 2 |
| Added Amount (vol %) | 5 | 5 | 5 | 5 | 5 | 5 |
| Heat Shrinkage Ratio (%) | 13.7 | 7.2 | 3.7 | 1.4 | 16.2 | 5.4 |
| Foamed Rubber |  |  |  |  |  |  |
| Expansion Ratio (%) | 20 | 20 | 20 | 20 | 20 | 20 |
| Cell Diameter (μm) | 50 | 50 | 50 | 50 | 50 | 50 |
| E'(∥)/E'(⊥)* | 1.16 | 1.43 | 1.58 | 1.68 | 1.12 | 1.46 |
| On-ice performance of tire (index) | 100 (control) | 133 | 153 | 168 | 95 | 142 |

*E'(∥): storage elastic modulus in orientation direction
E'(⊥): storage elastic modulus in direction orthogonal to orientation As can be seen from Tables 3 and 4, the orientation of the fibers of the fiber composite material of the present invention is markedly superior, and the on-ice friction performance of pneumatic tires in whose tread portion this fiber composite material is used greatly improves.

As can be understood from Comparative Examples 1 through 4, when the heat shrinkage ratio of the fibers falls outside of the range stipulated in the claims of the present invention, regardless of whether a foamed matrix or an unfoamed matrix is used in the fiber composite material, the orientation of the fibers of the fiber composite material is poor, and the on-ice friction performance of pneumatic tires in whose tread portion the fiber composite materials of the Comparative Examples are used greatly deteriorates.

Examples 9 through 16

Respective rubber compositions for a tire tread of Examples 9 through 16 were prepared by varying the types and amounts of short fibers, as well as by varying the expansion ratio and the hardness by adjusting the ratio of the natural rubber and the cis-1,4-polybutadiene rubber, the amounts of the carbon black and the silica, the foaming agent, and the concentration of cross-linking, in accordance with the compounding formulations listed in Table 5.

Comparative Examples 5 through 11

Respective rubber compositions for a tire tread of Comparative Examples 5 through 11 were prepared in accordance with the compounding formulations listed in Table 6.

Comparative Examples 5 and 6 are cases in which no short fibers are included. Comparative Example 7 is a case in which the heat shrinkage ratio of the short fibers is great. In Comparative Example 8, the short fibers have a large diameter and hardness. Comparative Example 9 is a case in which the short fibers are short. In Comparative Example 10, there are too many short fibers, and the hardness of the rubber composition is great. Comparative Example 11 is a case in which the balance between the average cell diameter and the diameter of the short fibers is poor, and the hardness of the rubber composition is great.

Respective test tires were manufactured by using the above-described rubber compositions.

TABLE 5

| Compounded component and amount thereof (parts by weight) | Ex. 9 | Ex. 10 | Ex. 11 | Ex. 12 | Ex. 13 | Ex. 14 | Ex. 15 | Ex. 16 |
|---|---|---|---|---|---|---|---|---|
| natural rubber | 70 | 40 | 40 | 70 | 30 | 30 | 30 | 40 |
| cis-1,4-polybutadiene rubber[1] | 30 | 60 | 60 | 30 | 70 | 70 | 70 | 60 |
| carbon black[2] (type) | 40 (A) | 30 (A) | 20 (A) | 40 (B) | 20 (A) | 20 (A) | 20 (A) | 10 (A) |
| silica[3] | 10 | 30 | 40 | 15 | 40 | 40 | 40 | 50 |
| silane coupling agent[4] | 1.0 | 3.0 | 4.0 | 1.5 | 4.0 | 4.0 | 4.0 | 5.0 |
| aromatic oil | 15 | 10 | 10 | 10 | 10 | 15 | 20 | 10 |
| stearic acid | 2 | 2 | 2 | 2 | 2 | 2 | 2 | 2 |
| anti-oxidant (IPPD)[5] | 2.5 | 2.5 | 2.5 | 2.5 | 2.5 | 2.5 | 2.5 | 2.5 |
| zinc oxide | 2 | 2 | 2 | 2 | 2 | 2 | 2 | 2 |
| vulcanization accelerator MBTS[6] | 0.6 | 0.6 | 0.6 | 0.6 | 0.6 | 0.6 | 0.6 | 0.6 |
| vulcanizing agent CBS[7] | 1.2 | 1.2 | 1.2 | 1.2 | 1.2 | 1.2 | 1.2 | 1.2 |
| sulfur | 1.3 | 1.3 | 1.1 | 1.3 | 1.1 | 1.1 | 1.1 | 1.1 |
| foaming agent DNPT[8] | 2.5 | 2.5 | 2.6 | 2.5 | 2.5 | 2.6 | 2.6 | 2.6 |
| foaming agent ADCA[9] | — | — | — | — | — | — | — | — |
| urea | 2.5 | 2.5 | 2.6 | 2.5 | 2.5 | 2.6 | 2.6 | 2.6 |
| short fibers | 5 | 10 | 5 | 10 | 10 | 10 | 10 | 8 |
| average cell diameter (μm) | 55 | 55 | 55 | 55 | 55 | 55 | 55 | 55 |
| expansion ratio (%) | 20.3 | 22.4 | 26.0 | 20.1 | 23.2 | 24.8 | 26.2 | 24.9 |

TABLE 5-continued

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| short fiber characteristics | | | | | | | | |
| length (mm) | 2 | 2 | 2 | 2 | 2 | 2 | 2 | 2 |
| diameter ($\mu$m) | 35 | 51 | 51 | 51 | 51 | 51 | 51 | 51 |
| aspect ratio (length/diameter) | 57 | 39 | 39 | 39 | 39 | 39 | 39 | 39 |
| heat shrinkage ratio (%) | 8 | 8 | 2 | 8 | 3.7 | 3.7 | 8 | 2.9 |
| hardness (°) at 0° C. | 52 | 51 | 51 | 51 | 49 | 45 | 47 | 49 |
| average cell diameter – diameter of short fiber ($\mu$m) | 20 | 4 | 4 | 4 | 4 | 4 | 4 | 4 |
| on-ice performance (index) | | | | | | | | |
| –1° C. | 100 | 103 | 108 | 104 | 107 | 108 | 105 | 107 |
| –8° C. | 100 | 101 | 102 | 101 | 104 | 106 | 105 | 103 |

TABLE 6

|  | Co Ex. 5 | Co Ex. 6 | Co Ex. 7 | Co Ex. 8 | Co Ex. 9 | Co Ex. 10 | Co Ex. 11 |
|---|---|---|---|---|---|---|---|
| Compounded component and amount thereof (parts by weight) | | | | | | | |
| natural rubber[1] | 100 | 70 | 40 | 40 | 40 | 40 | 40 |
| cis-1,4-polybutadiene rubber(1) | — | 30 | 60 | 60 | 60 | 60 | 60 |
| carbon black[2] | 50 | 50 | 30 | 30 | 30 | 30 | 30 |
| (type) | (B) | (B) | (A) | (A) | (A) | (A) | (A) |
| silica(3) | — | — | 30 | 30 | 30 | 30 | 30 |
| silane coupling agent[4] | — | — | 3.0 | 3.0 | 3.0 | 3.0 | 3.0 |
| aromatic oil | 5 | 5 | 10 | 10 | 10 | 10 | 10 |
| stearic acid | 2 | 2 | 2 | 2 | 2 | 2 | 2 |
| anti-oxidant (IPPD)[5] | 2.5 | 2.5 | 2.5 | 2.5 | 2.5 | 2.5 | 2.5 |
| zinc oxide | 2 | 2 | 2 | 2 | 2 | 2 | 2 |
| vulcanization accelerator MBTS[6] | 0.2 | 0.2 | 0.6 | 0.6 | 0.6 | 0.6 | 0.6 |
| vulcanizing agent CBS[7] | 0.5 | 0.5 | 1.2 | 1.2 | 1.2 | 1.2 | 1.2 |
| sulfur | 1.3 | 1.3 | 1.3 | 1.3 | 1.3 | 1.1 | 1.3 |
| foaming agent DNPT[8] | 2.5 | 2.5 | 2.5 | 2.5 | 2.5 | 2.5 | — |
| foaming agent ADCA[9] | — | — | — | — | — | — | 3.0 |
| urea | 2.5 | 2.5 | 2.5 | 2.5 | 2.5 | 2.5 | 2.5 |
| short fibers | — | — | 5 | 10 | 10 | 20 | 5 |
| average cell diameter ($\mu$m) | 55 | 55 | 55 | 55 | 55 | 55 | 20 |
| expansion ratio (%) | 20.0 | 19.8 | 22.9 | 22.5 | 23.1 | 20.1 | 20.2 |
| short fiber characteristics | | | | | | | |
| length (mm) | — | — | 2 | 2 | 0.3 | 2 | 2 |
| diameter ($\mu$m) | — | — | 51 | 20 | 51 | 51 | 51 |
| aspect ratio (length/diameter) | — | — | 39 | 100 | 5.9 | 39 | 39 |
| heat shrinkage ratio (%) | — | — | 18.7 | 8 | 8 | 8 | 8 |
| hardness (°) at 0° C. | 56 | 54 | 50 | 57 | 51 | 59 | 54 |
| average cell diameter – diameter of short fiber ($\mu$m) | — | — | 4 | 35 | 4 | 4 | –31 |
| on-ice performance (index) | | | | | | | |
| –1° C. | 93 | 93 | 94 | 95 | 95 | 101 | 96 |
| –8° C. | 96 | 98 | 101 | 92 | 100 | 93 | 98 |

Notes:
[1]UBEPOL 150L
[2]A:N134 ($N_2$SA: 146 $m^2$g); B:N234 ($N_2$SA: 126 $m^2$g)
[3]Nipsil AQ (manufactured by Nippon Silica Industrial Co., Ltd.)
[4]Si69 (manufactured by Degussa Co.)
[5]N-isopropyl-N'-phenyl-p-phenylenediamine
[6]dibenzothiazyldisulfide
[7]N-cyclohexyl-2-benzothiazolesulfeneamide
[8]dinitrosopentamethylenetetramine
[9]azodicarbonamide As can be seen from Tables 5 and 6, as compared with conventional tires, the foamed tire of the present invention exhibits an excellent water removing effect and simultaneously a sufficient adhesive effect, without a deterioration in the respective performances of the tire. Further, the on-ice performance of the foamed tire of the present invention at various conditions from extremely low temperatures to around 0° C. is also superior.

What is claimed is:

1. A pneumatic tire comprising a tire tread portion, said tire tread portion comprising a fiber composite foamed material which comprises short fibers and a material selected from the group consisting of a foamed material of a cross-linked rubber and a foamed material of a thermoplastic elastomer, wherein said short fibers include at least one fiber selected from the group consisting of organic synthetic fibers, regenerated fibers, and natural fibers, a heat shrinkage ratio of said short fibers is less than or equal to 8% at molding temperatures of said composite material of 140 to 200° C., said short fibers are not subjected to adhering processing for adhering the short fibers to the foamed material, said short fibers are capable of dropping off from the surface of said tire tread portion during use to form concave areas in the surface of the tire tread portion and said short fibers are oriented in an orientation direction within said fiber composite foamed material.

2. A pneumatic tire according to claim 1, wherein said fiber composite foamed material has closed cells and is provided at least at a surface of a tire tread which surface substantially contacts a road surface, said tire tread comprises sipes, wherein said fiber composite foamed material has an average cell diameter of 10 to 120 $\mu$m and an expansion ratio of 3 to 50%, and said fiber composite foamed material comprises 5 to 55 parts by weight of carbon black, 55 to 5 parts by weight of silica, a diene rubber component which comprises 70 to 20 parts by weight of natural rubber and 30 to 80 parts by weight of polybutadiene rubber, 1 to 15 parts by weight of said short fibers with respect to 100 parts by weight of said diene rubber component, and a hardness of the surface of the tire tread being 52 or less at 0° C., and said short fibers have an average length which is from 0.5 to 3 mm and which is shorter than a minimum gap between sipes of the tire surface, an average diameter of 30 to 100 μm, and an aspect ratio of 5 to 100.

3. A pneumatic tire according to claim 2, wherein a nitrogen absorption specific surface area ($N_2SA$) of the carbon black is 120 to 170 $m^2/g$, and a nitrogen absorption specific surface area ($N_2SA$) of the silica is 180 to 250 $m^2/g$.

4. A pneumatic tire according to claim 1, wherein the heat shrinkage ratio of said short fibers is 8% or less at a tire molding temperature of 170° C.

5. A pneumatic tire according to claim 1, wherein the average cell diameter of said foamed material of a cross-linked rubber and said foamed material of a thermoplastic elastomer and the average diameter of said short fibers satisfy the relation expressed by the following expression: $-30 \leq$ average cell diameter–average diameter of short fibers $\leq 40$ (μm).

6. The pneumatic tire according to claim 1, wherein said short fibers have an average length of from 0.5 to 3 mm, an aspect ratio of 5 to 100, and an average diameter of 30 to 100 μm.

7. The pneumatic tire according to claim 1, wherein said tire tread portion comprises sipes and said short fibers have a length which is shorter than a minimum gap between sipes.

8. The pneumatic tire according to claim 1, wherein said foamed material of a cross-linked rubber and said foamed material of a thermoplastic elastomer has an average cell diameter of 10 to 120 μm and an expansion ratio of 3 to 50%.

9. The pneumatic tire according to claim 1, wherein a heat shrinkage ratio of said short fibers is less than or equal to 4% at molding temperatures of said composite material of 140 to 200° C.

10. The pneumatic tire according to claim 1, wherein the added amount of said short fibers with respect to said foamed material is 0.1 to 80 volume percent of the volume of said foamed material.

11. A pneumatic tire according to claim 1, further comprising at least one compounding agent selected from the group consisting of a softener, a vulcanizing agent, a vulcanization accelerator, a vulcanization assistant, an antioxidant, a colorant, a charge preventing agent, a filler, a lubricant, an anti-oxidizing agent, a pigment, a wax, a silane coupling agent, a dispersant, a stearic acid, a zinc oxide, an ester base plasticizer, and a liquid polymer.

12. A pneumatic tire according to claim 1, further comprising 5 to 55 parts by weight silica based on the solid phase rubber portion of the foamed material of a cross-linked rubber and said foamed material of a thermoplastic elastomer.

13. A pneumatic tire according to claim 1, further comprising 5 to 55 parts by weight carbon black based on the solid phase rubber portion of the foamed material of a cross-linked rubber and said foamed material of a thermoplastic elastomer.

14. The pneumatic tire according to claim 1, wherein said foamed material has an average cell diameter of 10 to 120 μm and an expansion ratio of 3 to 50%, said foamed rubber layer comprises 5 to 55 parts by weight of carbon black, 55 to 5 parts by weight of silica, a diene rubber component which comprises 70 to 20 parts by weight of natural rubber and 30 to 80 parts by weight of polybutadiene rubber and 1 to 15 parts by weight of said short fibers with respect to 100 parts by weight of said diene rubber component, and a hardness of the surface of the tire tread is 52 or less at 0° C.

15. A pneumatic tire according to claim 1, wherein said concave areas formed by the dropping off of said fibers during use connect with concave portions due to the cells of the foamed material to form flow paths for water.

* * * * *